(12) United States Patent
Mizukoshi

(10) Patent No.: US 8,327,140 B2
(45) Date of Patent: Dec. 4, 2012

(54) SYSTEM AND METHOD FOR AUTHENTICATION IN WIRELESS NETWORKS BY MEANS OF ONE-TIME PASSWORDS

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 1003 days.

(21) Appl. No.: 12/307,883

(22) PCT Filed: Jun. 22, 2007

(86) PCT No.: PCT/JP2007/063057
§ 371 (c)(1),
(2), (4) Date: Jan. 7, 2009

(87) PCT Pub. No.: WO2008/004494
PCT Pub. Date: Jan. 10, 2008

(65) Prior Publication Data
US 2009/0240939 A1   Sep. 24, 2009

(30) Foreign Application Priority Data
Jul. 7, 2006   (JP) .................................. 2006-188540

(51) Int. Cl.
*H04L 29/06* (2006.01)
(52) U.S. Cl. .............................. 713/168; 380/270; 726/3
(58) Field of Classification Search .................. 712/150, 712/168, 170; 726/2–7
See application file for complete search history.

(56) References Cited

U.S. PATENT DOCUMENTS

| | | |
|---|---|---|
| 2001/0049787 A1 | 12/2001 | Morikawa et al. |
| 2003/0110401 A1* | 6/2003 | Aoshima et al. ............... 713/202 |
| 2005/0113070 A1 | 5/2005 | Okabe |
| 2006/0059344 A1 | 3/2006 | Mononen |

FOREIGN PATENT DOCUMENTS

| | | |
|---|---|---|
| JP | 2004021549 A | 1/2004 |
| JP | 2005051625 A | 2/2005 |

OTHER PUBLICATIONS

International Search Report for PCT/JP2007/063057 mailed Oct. 31, 2007.
N. Haller Bellcore, "The S/KEY One-Time Password System", IETF Standard, Internet Engineering Task Force, RFC 1760, Switzerland (CH), Feb. 1995.
Leslie Lamport, "Password Authentication with Insecure Communication", Communication of the ACM, vol. 24, No. 11, Nov. 1981, pp. 770-772.

* cited by examiner

*Primary Examiner* — Gilberto Barron, Jr.
*Assistant Examiner* — Abdulhakim Nobahar

(57) ABSTRACT

The present invention is directed to perform high-reliable authentication using a one-way function that a communication is a communication which was performed with the same apparatus to be authenticated by storing a password only in an apparatus to be authenticated (it is unnecessary to store a password in both of an authentication apparatus and an apparatus to be authenticated) without transmitting a challenge code. When a setting is updated in a setting management server, authentication is performed by using a one-time password obtained last time. A sound communication terminal performs a process using a hash function once on a one-time password transmitted this time, and performs authentication by determining whether the processed one-time password matches a one-time password obtained last time or not. Whether the information at the time of the change in the setting is proper or not is determined by a sound terminal.

18 Claims, 10 Drawing Sheets

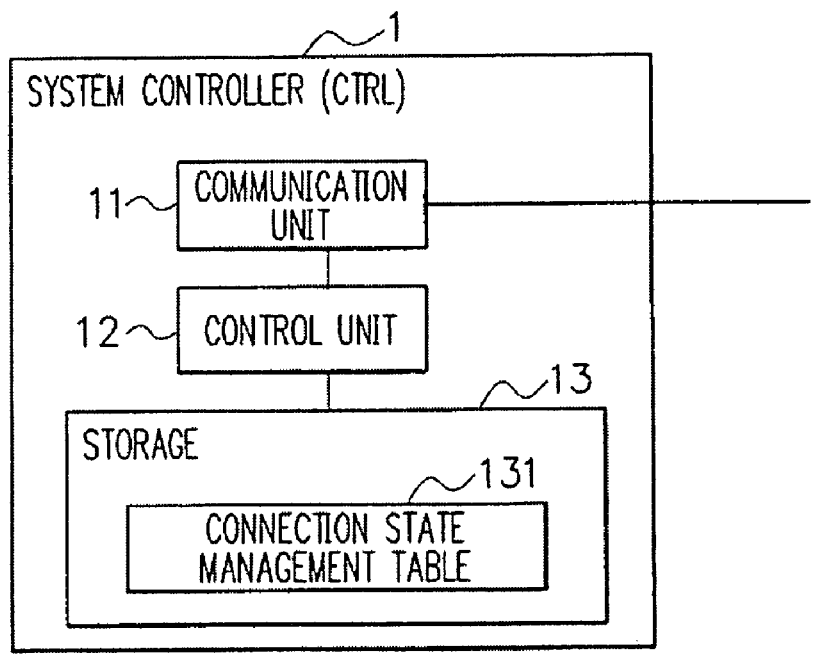

F I G. 7

| TERMINAL MAC ADDRESS | SERIAL NUMBER | SETTING REGISTRATION INFORMATION ||||| CIPHER INFORMATION |||
| --- | --- | --- | --- | --- | --- | --- | --- | --- | --- |
| | | ESSID | SIP ADDRESS | USER ID | ... | PASSWORD | n | ... |
| 00:aa:bb:cc:dd:ee | aa0123 | voice001 | aaa@bb.cc.dd | 001 | ... | *** | 100 | ... |
| 00:aa:bb:cc:dd:ff | bb1234 | voice018 | bbb@cc.dd.ee | 002 | ... | *** | 110 | ... |
| 00:aa:bb:dd:cc:cc | cc3456 | data001 | ccc@dd.ee.ff | 003 | ... | *** | 80 | ... |
| 00:aa:bb:ab:cd:ef | ab5678 | voice008 | ddd@aa.bb.cc | 004 | ... | *** | 90 | ... |
| ... | ... | ... | ... | ... | ... | ... | ... | ... |

SYSTEM AND METHOD FOR AUTHENTICATION IN WIRELESS NETWORKS BY MEANS OF ONE-TIME PASSWORDS

This application is the national phase of PCT/JP2007/063057, filed Jun. 22, 2007, which claims priority to Japanese Application No. 2006-188540, filed Jul. 7, 2006.

BACKGROUND OF THE INVENTION

1. Field of the Invention

The present invention relates to an authentication system for authenticating an apparatus to be authenticated by an authentication apparatus by performing a ciphering process, an apparatus to be authenticated, an authentication apparatus, an authenticating method, a program for an apparatus to be authenticated, and a program for an authentication apparatus.

2. Description of the Related Art

Hitherto, there is a challenge-response authentication as an authenticating method using a one-way function such a hash function.

FIG. 13 shows an example of a challenge-response authentication when a server accesses a client terminal. In this case, the server is an apparatus to be authenticated, and the client terminal is an authentication apparatus.

It is assumed that a password and a number of processes "n" using a hash function are pre-stored in the server. The same password is pre-stored in the client terminal.

First, the server accesses the client terminal and transmits a challenge code and the number "n" (step S501).

The client terminal which receives the challenge code and the number "n" performs a process using a hash function on the password "n" times, thereby generating a ciphered password $K_n$ (step S502).

The server performs a process using a hash function on the password (n−1) times, thereby generating a ciphered password $K_{n-1}$ (step S503), and transmits the password $K_{n-1}$ to the client terminal (step S504).

The client terminal performs the process using the hash function on the received password $K_{n-1}$ once thereby obtaining the ciphered password $K_n$, and executes an authentication by determining whether the password held by itself matches the password $K_n$ generated at step S502 or not (step S505).

A conventional system for performing authentication gives a one-time password for a remote command when a network monitoring apparatus issues the remote command for starting an agent program of an apparatus to be monitored, performs authentication based on the one-time password, and then, starts the agent program (for example, Japanese Patent Application Laid-Open (JP-A) No. 2004-21549 (document 1)).

In another conventional system, at the time of transmitting an update packet of a profile from a management PC to a user PC, information of an encryption key is included in the update packet. The information is encrypted with a hash key, and the encrypted information is transmitted. The user PC receives the information and decrypts the information (for example, JP-A No. 2005-51625 (document 2)).

Although the conventional communication systems intend to increase the reliability of authentication by using a one-way function such as a hash function, two operations of transmitting a challenge code and transmitting $K_{n-1}$ are necessary.

There is room for simplifying procedures to decide whether the same authenticated apparatus as one used in the previous communication has established the current communication.

In addition, the same password has to be stored in both of the authenticating apparatus and the apparatus to be authenticated.

That is, in the case of authenticating that a communication was performed with the same apparatus to be authenticated, there is room for improvement in security.

In the conventional system of document 1, authentication using a one-time password is only considered.

In the conventional system of document 2, a packet encrypted with a hash key is only decrypted on the receiver's side.

Both of the conventional systems disclosed in documents 1 and 2 do not take consideration of simplification of authentication procedures such as transmission of a challenge code or of simplification of storing a password so as not to let both of the authenticating device and the authenticated device possess the password.

SUMMARY OF THE INVENTION

An exemplary object of the invention to provide an authentication system, an apparatus to be authenticated, an authentication apparatus, an authenticating method, a computer-readable medium for an apparatus to be authenticated, and a computer-readable medium for an authentication apparatus capable of performing high-reliable authentication using a one-way function to authenticate a communication as a communication that was performed with the same apparatus to be authenticated by storing a password only in the apparatus to be authenticated (it is unnecessary to store a password in both of the authentication apparatus and the apparatus to be authenticated) without necessity of transmitting a challenge code.

An authentication system according to an exemplary aspect of the invention includes an authentication apparatus and an apparatus to be authenticated. The apparatus to be authenticated includes: a storing unit that stores a password and information indicative of the number of times of processing of the password with a predetermined one-way function; a first transmitting unit that transmits an encrypted password obtained by processing the password with the one-way function for the number of times of processing, and the information indicative of the number of times of processing to the authentication apparatus; and a second transmitting unit that transmits an encrypted password obtained by processing the password with the one-way function for the subtracted number of times derived by subtracting a predetermined subtraction number from the number of times of processing, and the subtracted number of times to the authentication apparatus.

The authentication apparatus performs authentication on the basis of the encrypted password obtained by being processed the number of processing times, the information indicative of the number of processing times, the encrypted password obtained by being processed the subtracted number of times, and the information indicative of the subtracted number of times, the passwords and information being received from the apparatus to be authenticated.

An authentication system according to an exemplary aspect of the invention includes an authentication apparatus and an apparatus to be authenticated. The apparatus to be authenticated includes: a storing unit that stores a password and information indicative of the number of times of processing of the password with a predetermined one-way function; a first transmitting unit that transmits an encrypted password obtained by processing the password with the one-way function for the number of times of processing to the authentication apparatus; and a second transmitting unit that transmits an encrypted password obtained by processing the password with the one-way function for the number of times derived by subtracting one from the number of times of processing to the authentication apparatus.

An apparatus to be authenticated for sending an authentication request to an authentication apparatus according to an exemplary aspect of the invention includes: a storing unit that stores a password and information indicative of the number of times of processing of the password with a predetermined one-way function; a first transmitting unit that transmits an encrypted password obtained by processing the password with the one-way function for the number of times of processing, and the information indicative of the number of times of processing to the authentication apparatus; and a second transmitting unit that transmits an encrypted password obtained by processing the password with the one-way function for the number of times derived by subtracting a predetermined subtraction number from the number of times of processing, and the subtracted number of times to the authentication apparatus.

An apparatus to be authenticated for sending an authentication request to an authentication apparatus according to an exemplary aspect of the invention includes: a storing unit that stores a password and information indicative of the number of times of processing of the password with a predetermined one-way function; a first transmitting unit that transmits an encrypted password obtained by processing the password with the one-way function for the number of times of processing to the authentication apparatus; and a second transmitting unit that transmits an encrypted password obtained by processing the password with the one-way function for the subtracted number of times one smaller than the number of processing times to the authentication apparatus.

An authentication apparatus for performing authentication in response to an authentication request from an apparatus to be authenticated according to an exemplary aspect of the invention includes: a receiving unit that receives information from the apparatus to be authenticated; an encrypting unit that, when an encrypted password obtained by processing a password with a one-way function for the number of times derived by subtracting a predetermined subtraction number from a predetermined number of times of processing is received by the receiving unit from the apparatus to be authenticated, processing the encrypted password with the one-way function for the subtraction number calculated by subtracting the subtracted number of times from the number of processing times; and an authenticating unit that authenticates the apparatus to be authenticated, by determining whether an encrypted password obtained by processing the password with the one-way function the number of times of processing and received by the receiving unit coincides with a password calculated by the encrypting unit.

An authentication apparatus for authenticating an apparatus to be authenticated in response to an authentication request from the apparatus to be authenticated according to an exemplary aspect of the invention includes: a receiving unit that receives information from the apparatus to be authenticated; an encrypting unit that, when an encrypted password obtained by processing a password with a one-way function for the subtracted number of times one smaller than a predetermined number of processing times is received by the receiving unit from the apparatus to be authenticated, processing the encrypted password with the one-way function only once; and an authenticating unit that authenticates the apparatus to be authenticated, by determining whether an encrypted password obtained by processing the password with the one-way function the number of times of processing coincides with a password calculated by the encrypting unit A authenticating method according to an exemplary aspect of the invention includes a first transmitting step of transmitting an encrypted password obtained by processing a password with a predetermined one-way function a predetermined number of processing times together with information indicative of the number of processing times from the apparatus to be authenticated to the authentication apparatus; and a second transmitting step of transmitting an encrypted password obtained by processing the password with the one-way function the number of times derived by subtracting a predetermined subtraction number from the number of processing times together with the subtracted number of times from the apparatus to be authenticated to the authentication apparatus.

An authenticating method according to an exemplary aspect of the invention includes: a first transmitting step of transmitting an encrypted password obtained by processing a password with a predetermined one-way function a predetermined number of times of processing from the apparatus to be authenticated to the authentication apparatus; and a second transmitting step of transmitting an encrypted password obtained by processing the password with the one-way function for the subtracted number of times derived by subtracting one from the number of times of processing from the apparatus to be authenticated to the authentication apparatus.

A computer-readable medium storing a program according to an exemplary aspect of the invention causes the apparatus to be authenticated to perform: a first transmitting process for transmitting an encrypted password obtained by processing a password with a predetermined one-way function for a predetermined number of processing times together with information indicative of the number of processing times to the authentication apparatus; and a second transmitting process for transmitting an encrypted password obtained by processing the password with the one-way function the subtracted number of times derived by subtracting a predetermined subtraction number from the number of processing times together with the subtracted number of times to the authentication apparatus.

A computer-readable medium storing a program according to an exemplary aspect of the invention causes the apparatus to be authenticated to perform: a first transmitting process for transmitting an encrypted password obtained by processing a password with a predetermined one-way function a predetermined number of processing times to the authentication apparatus; and a second transmitting process for transmitting an encrypted password obtained by processing the password with the one-way function the subtracted number of times smaller than the number of processing times by one to the authentication apparatus.

A computer-readable medium storing a program according to an exemplary aspect of the invention causes the authentication apparatus to perform: a receiving process for receiving information from the apparatus to be authenticated; and an encrypting process for, when an encrypted password obtained by processing a password with a one-way function the number of times derived by subtracting a predetermined subtraction number from a predetermined number of processing times is received in the receiving process from the apparatus to be authenticated, processing the encrypted password with the one-way function the subtraction number calculated by subtracting the subtracted number of times from the number of processing times.

A computer-readable medium storing a program according to an exemplary aspect of the invention causes the authentication apparatus to perform: a receiving process for receiving information from the apparatus to be authenticated; and an encrypting process for, when an encrypted password obtained by processing a password with a one-way function the subtracted number of times smaller than a predetermined number of processing times by one is received from the apparatus to be authenticated in the receiving process, processing the encrypted password with the one-way function only once.

BRIEF DESCRIPTION OF THE DRAWINGS

Features of the disclosed embodiments will be described by way of the following detailed description with reference to the accompanying drawings in which:

FIG. 2 is a block diagram showing a configuration example of a system controller 1.

FIG. 3 is a diagram showing a configuration example of a connection state management table 131.

FIG. 7 is a diagram showing a configuration example of a setting information management table 441.

DETAILED DESCRIPTION OF EXEMPLARY EMBODIMENTS

Exemplary embodiments of applying an authentication system, an apparatus to be authenticated, an authentication apparatus, an authenticating method, a program for an apparatus to be authenticated, and a program for an authentication apparatus to a radio communication system using a wireless LAN (Local Area Network) will be described in detail with reference to the drawings.

The radio communication systems function as setting management systems for managing setting information of each of terminals and capable of automatically and safely updating settings in each of terminals having a sound communication function.

First, the configuration common to exemplary embodiments will be described.

Figure 1:
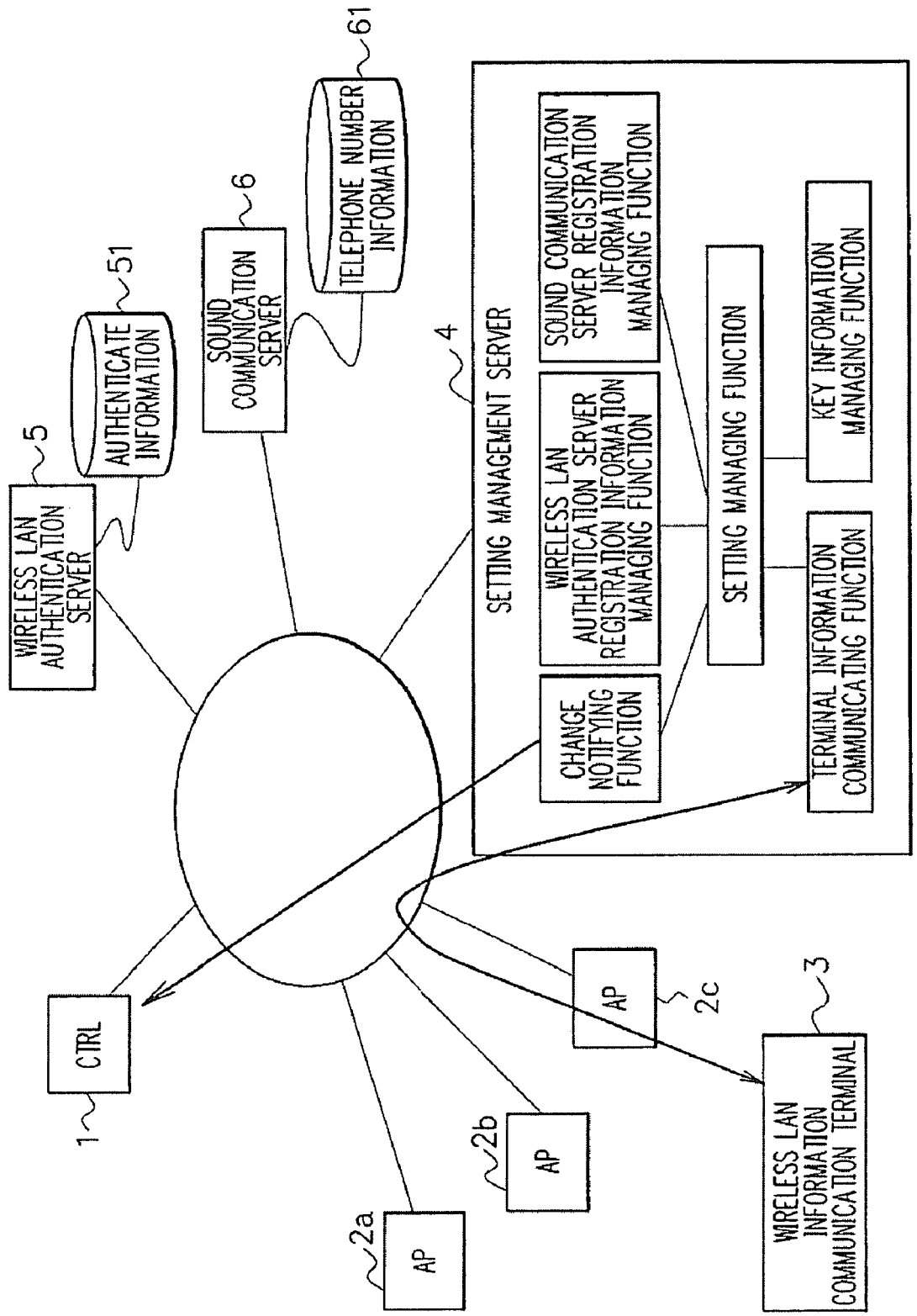
FIG. 1 is a block diagram showing a radio communication system as an embodiment of the invention.

In the radio communication system, as shown in FIG. 1, a system controller (CTRL) 1, a radio base station (AP: Access Point) 2 for controlling radio communication connection from a wireless LAN information communication terminal (sound communication terminal) 3, a setting management server 4, a wireless LAN authentication server 5, and a sound communication server 6 are connected to each other via a network.

The system controller (CTRL) 1 controls the radio base stations 2 and controls radio communication in the radio communication system.

The wireless LAN authentication server 5 stores authentication information 51 of each of information communication terminals and performs an authentication at the time when the information communication terminal 3 belongs to an AP.

The sound communication server 6 stores telephone number information 61 and the like used when an information communication terminal makes a call and controls a sound communication between information communication terminals.

The setting management server 4 manages setting registration information in each of the information communication terminals. When the set registration information is updated, the setting management server 4 accesses the information communication terminal 3 and automatically updates the terminal setting information in the information communication terminal 3.

Specifically, when the setting registration information is updated, the information communication terminal 3 functions as an authentication apparatus and the setting management server 4 functions as an apparatus to be authenticated. The information communication terminal 3 authenticates an access from the setting management server 4 and, when the access is authenticated, the terminal setting information is automatically updated.

The functions of the setting management server will be described hereinbelow.

By a change notifying function, when a setting information change is made in the information communication terminal 3, the change is notified to devices storing the setting information in the radio communication system.

By a wireless LAN authentication server registration information managing function, when a setting change is made in the information communication terminal 3, the change is notified to the wireless LAN authentication server 5 to update the setting. By the operation, the wireless LAN authentication server 5 receives an update notification each time the setting information is updated in the setting management server 4, and updates the registration information to the latest registration information.

By a sound communication server registration information managing function, when the setting change is made in the information communication terminal 3, the change is notified to the sound communication server 6, and the setting is updated. By the operation, the sound communication serve 6 receives an update notification each time the setting information is updated by the setting management server 4, and updates the registration information to the latest registration information.

By a setting managing function, the setting managing operation such as a change in any of setting information stored in the setting management server 4 is controlled.

By a terminal information communication function, in the case of changing setting information of a terminal, radio communication with the information communication terminal 3 is established or setting information is changed.

By a key information managing function, an operation using a hash function in the case of changing setting information of a terminal, or the like is performed to control a ciphering process and authentication.

The configuration of each of the apparatuses of the radio communication system will flow be described.

As shown in FIG. 2, the system controller 1 has a communication unit 11 that establishes communications with other apparatuses, a control unit 12 that controls the general processing of the system controller 1, and a storage unit 13.

The storage unit 13 stores a program (not shown) and a connection state management table 131.

The connection state management table 131 is stored in such a manner that MAC addresses of information communication terminals and the connection states of the terminals are associated with each other. When key information of the information communication terminal 3 is notified from another apparatus, the key information is stored so as to be associated with the MAC address of the corresponding terminal.

Figure 4:
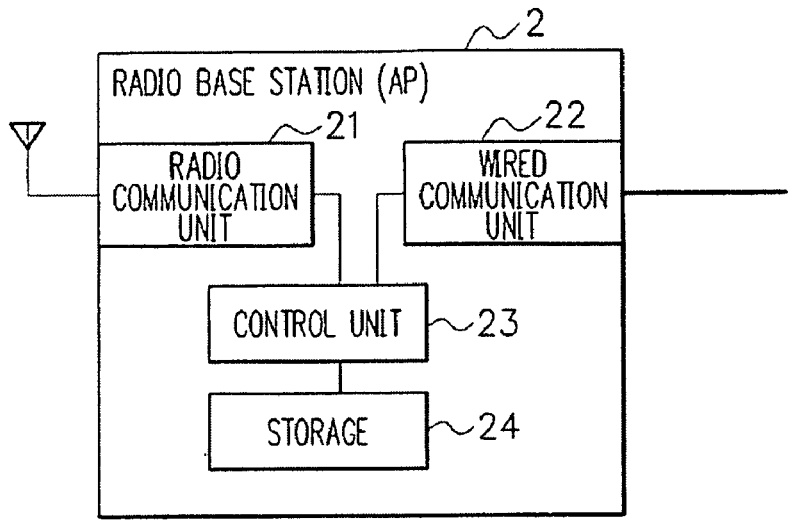
FIG. 4 is a block diagram showing a configuration example of a radio base station 2.

As shown in FIG. 4, the radio base station 2 has a radio communication unit 21 that performs radio communication with another apparatus such as the information communication terminal 3, a wired communication unit 22 that performs wired communication with another apparatus such as the system controller 1, a control unit 23 that controls the general processing of the radio base station 2, and a storage unit 24.

Figure 5:
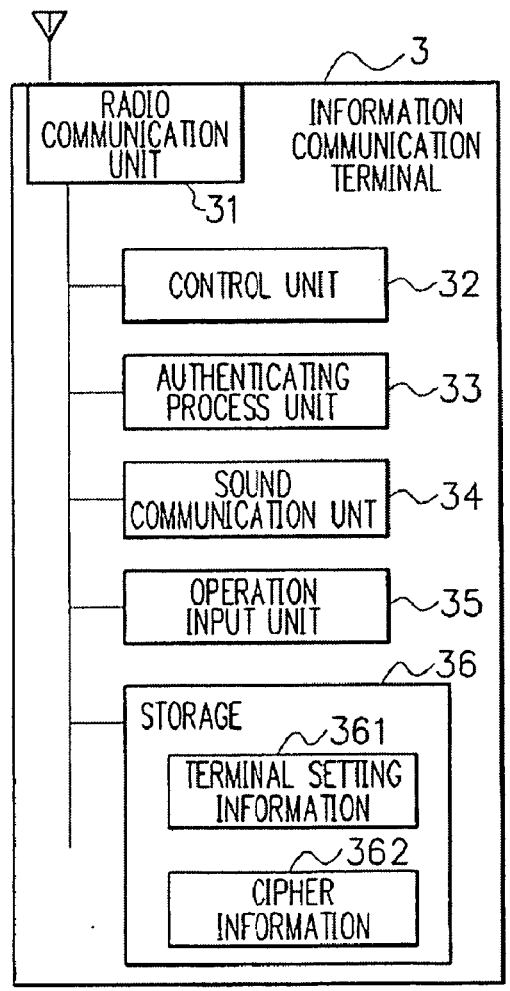
FIG. 5 is a block diagram showing a configuration example of an information communication terminal 3.

As shown in FIG. 5, the information communication terminal 3 has a radio communication unit 31 that performs radio communication with the radio base station 2, a control unit 32 that controls the general processing of the information communication terminal 3, an authenticating process unit 33 that performs an authenticating process using a hash function, a sound communication unit 34 that controls sound communication using a microphone and a speaker, an operation input unit 35 that inputs information according to an operation of the user, and a storage unit 36.

The storage unit 36 stores terminal setting information 361 as setting information of the information communication terminal 3 and cipher information 362 concerning encryption processing transmitted from the setting management server 4 and the like.

Figure 6:
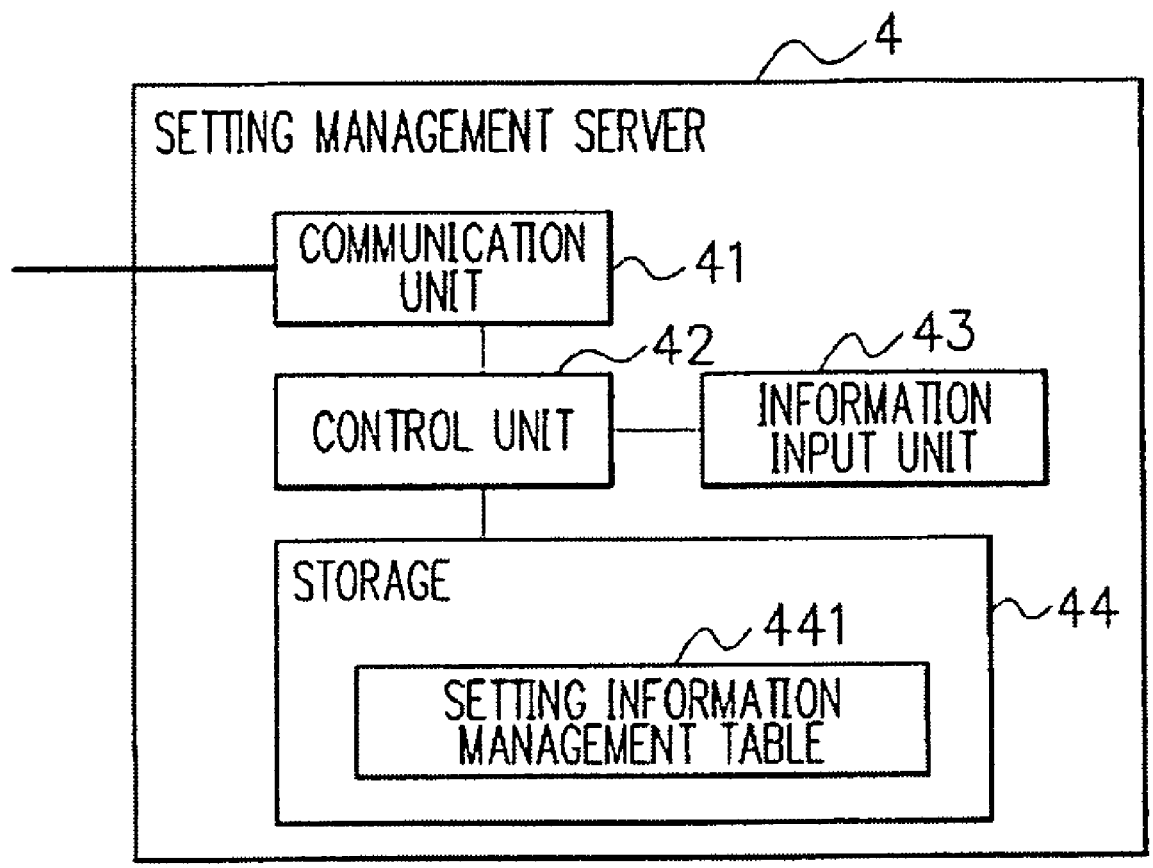
FIG. 6 is a block diagram showing a configuration example of a setting management server 4.

The setting management server 4 has, as shown in FIG. 6, a communication unit 41 that performs communication with another apparatus, a control unit 42 that controls the entire processing of the setting management server 4, an information input unit 43 that inputs information at the time of changing setting information or the like, and a storage unit 44.

The storage unit 44 stores a setting information management table 441 of setting information of the information communication terminals 3 and the like.

In the setting information management table 441, as shown in FIG. 7, the serial number, setting registration information, and cipher information of the information communication terminal 3 is stored so as to be associated with the MAD address of the terminal.

The setting registration information is information set for the information communication terminals 3 and includes various kinds of information for connection to a wireless LAN such as an ESSID (Extended Service Identifier), an SIP (Session Initiation Protocol) address, user ID, and an authentication method.

The cipher information includes, for example, a password and the number "n" that indicates the number of times the password goes through a hash function.

First Exemplary Embodiment

A first exemplary embodiment will now be described.

When a change occurs in the setting information of each terminal in the server 4, the terminal 3 authenticates the server 4, and the server 4 automatically safely updates the setting information of the terminal 3.

Figure 8:
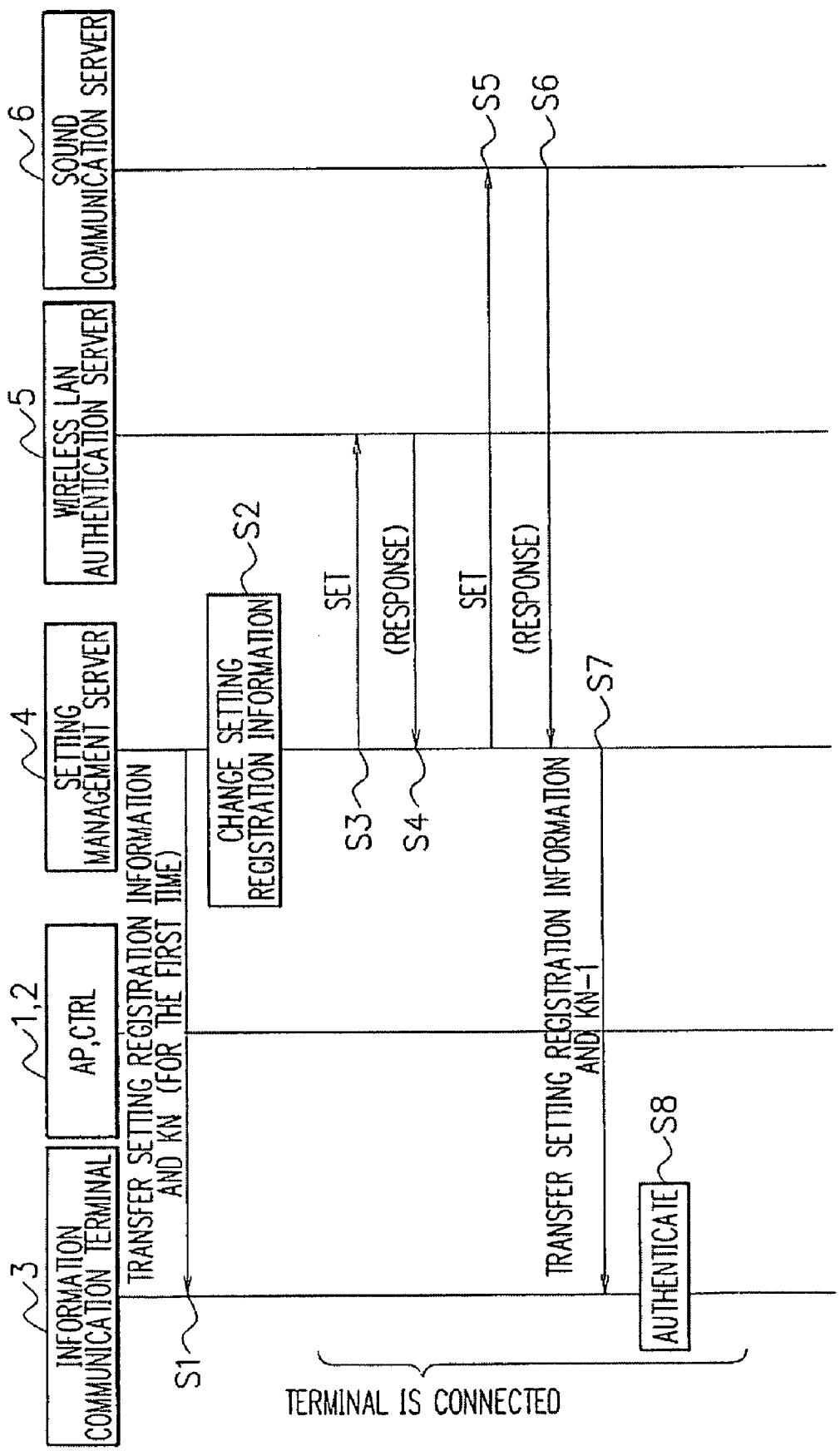
FIG. 8 is a sequence diagram showing an operation example of a radio communication system as a first embodiment.

The operation of the radio communication system as the first embodiment will be described with reference to FIG. 8.

First, at the first connection to the server 4 such as initial setting, the terminal 3 obtains setting registration information from the server 4 and, simultaneously, receives key information (step S1).

The key is a one-time password that can be used only once, and the server 4 generates a one-time password. A one-time password is obtained as an "n"-time hash value derived by processing a password (pwd) by a hash function n times as follows:

$$K_n = \text{hash}(pwd, n)$$

where hash(*,*) is a known one-way hash function.

The terminal 3 stores the transmitted setting information as the terminal setting information 361 and also stores the transmitted $K_n$ and "n" as the cipher information 362.

Thereafter, when the setting of the terminal is changed by the administrator of the system or the like (step S2), the change in the setting information is transmitted to the wireless LAN authentication server 5 by the wireless LAN authentication server registration information managing function, and the setting information in the server 5 is changed (steps S3 and S4).

By the sound communication server registration information managing function, the change in the setting information is transmitted to the server 6 to change the setting information in the server 6 (steps S5 and S6).

By the terminal information communication function, if the target terminal 3 is being connected, the setting information and key information are transmitted to the terminal 3 (step S7).

At the notification of the change, the server 4 calculates $K_{n-1}$ from $K_{n-1} = \text{hash}(pwd, n-1)$ and notifies the terminal of the result.

The terminal 3 performs the process using once the hash function on $K_{n-1}$ received from the server 4, thereby obtaining $K_n'$: $K_n' = \text{hash}(K_{n-1}, 1)$. The terminal 3 compares $K_n'$ with $K_n$ obtained at the time of the initial setting and determines whether $K_n'$ and $K_n$ match each other or not, thereby performing authentication (step S8).

When the authentication succeeds, the terminal 3 stores the transmitted set information as the terminal setting information 361 and the transmitted $K_{n-1}$ and n−1 as the cipher information 362.

The terminal setting information 361 is safely updated. At the next updating, when the authentication is performed next, the process using the hash function is performed once on the transmitted $K_{n-2}$ by using $K_{n-1}$ and n−1 of the cipher information 362, and compares the resultant with $K_{n-1}$ to determine whether they match each other, thereby performing authentication.

When the server 4 transmits setting registration information, new keys $K_m$ and m are transmitted together with $K_{n-1}$. In this manner, even when the authentication using the new key $K_m$ is performed at the next authentication, the foregoing embodiment can be similarly realized.

As described above, in the first exemplary embodiment, the authentication is performed by using the one-time password obtained at the previous updating of the setting in the server 4. Specifically, the terminal 3 performs the process using the hash function once on the one-time password $K_{n-1}$ transmitted this time, and performs authentication by determining whether the processed one-time password $K_{n-1}$ matches the one-time password $K_n$ obtained the last time. A sound terminal determines whether information at the time of changing the setting is valid.

While a security countermeasure is sufficiently taken to prevent a false access point from hijacking communication, the setting of each terminal can be automatically updated.

Since authentication is performed by determining whether the one-time password coincides with that of last time, transmission of a challenge code is unnecessary unlike a conventional challenge response method. The terminal 3 does not have to store the password. While only the server 4 stores the password, it can be confirmed with highly reliable authentication using the hash function that the current communication is, like the previous communication, requested from the server 4.

Second Exemplary Embodiment

A second exemplary embodiment of the invention will now be described.

Notification of a change and a recognizing process are also performed prior to the transmission of setting registration information from the setting management server 4 to the information communication terminal 3 as shown in the first exemplary embodiment.

Figure 9:
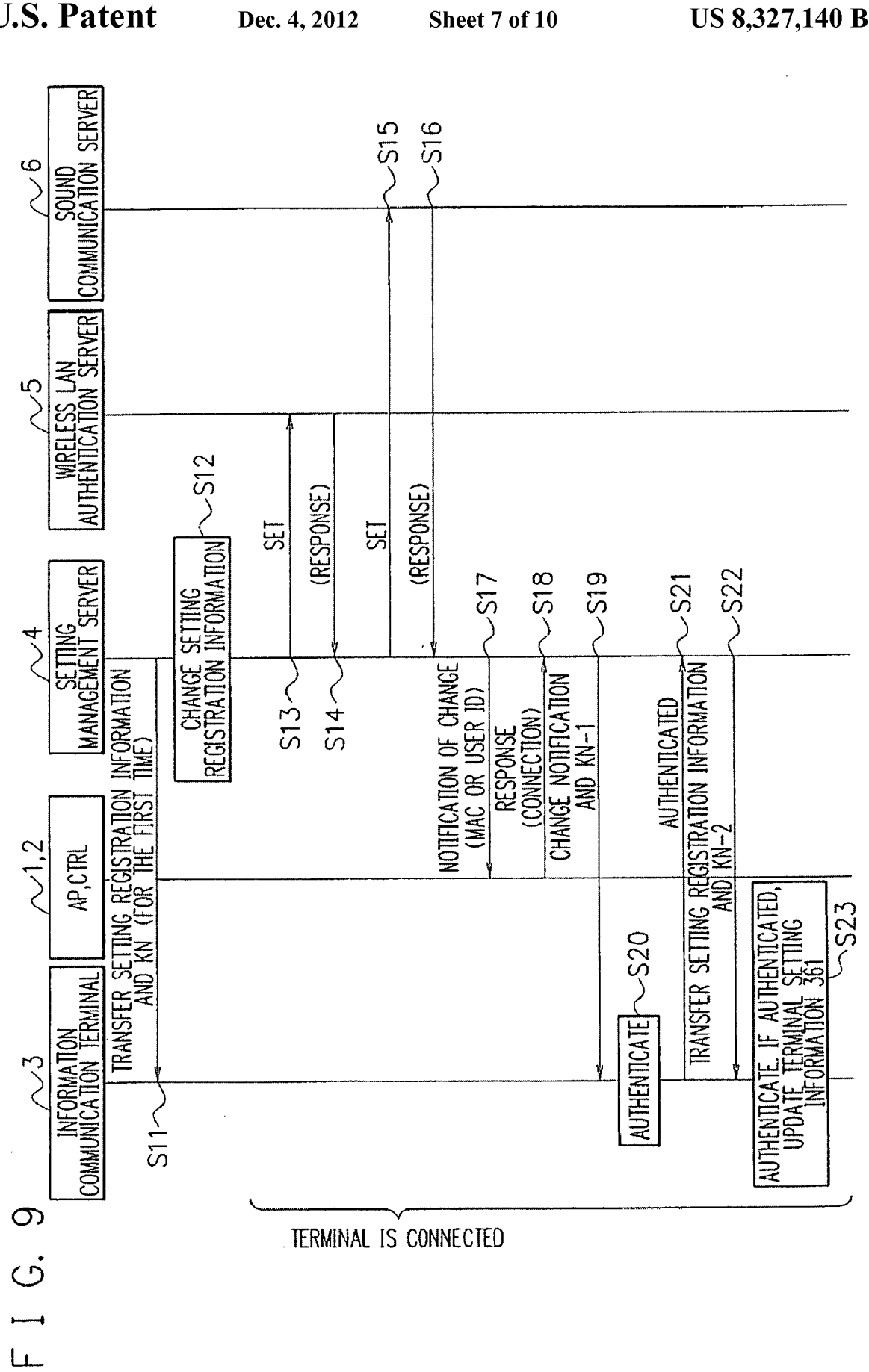
FIG. 9 is a sequence diagram showing an operation example of a radio communication system as a second embodiment.

The operation of a radio communication system will be described with reference to FIG. 9.

First, in a manner similar to the first exemplary embodiment, the terminal 3 obtains setting registration information from the server 4 and, simultaneously, receives key information $K_n$ and "n" at the connection to the server 4 for the first time such as the initial setting (step S11).

When the setting of a terminal is changed by the administrator of the system or the like (step S12), the setting information in the wireless LAN authentication server 5 and the sound communication server 6 is changed, in a manner similar to the first exemplary embodiment (steps S13 to S16).

By the terminal information communication function of the server 4, specification information (MAC address or user ID) specifying the terminal is transmitted so as to be associated with the change notification to the controller 1 that manages the radio base station 2 (step S17).

When the terminal 3 specified by the specification information is being connected, the controller 1 sends a response indicting that the terminal 3 is being connected to the server 4 (step S18).

When the response indicative of the connection is received, the server 4 transmits the change notification together with $K_{n-1}$ to the terminal 3 (step S19).

The terminal 3 performs the process using once the hash function on $K_{n-1}$ received from the server 4, thereby obtaining $K_n'$: namely, $K_n'=\text{hash}(K_{n-1})$. The terminal 3 compares $K_n'$ with $K_n$ obtained at the previous setting and performs authentication by determining whether $K_n'$ and $K_n$ match each other (step S20).

When a server is turned out to be the server 4 of the previous setting, the terminal 3 notifies the server 4 of the success of authentication together with the serial number and the like (step S21).

When the information of the successful authentication is received, the server 4 transmits the changed setting registration information together with $K_{n-2}$, whose processes of the hash function is one smaller than that of $K_{n-1}$, key information previously transmitted (step S22).

The terminal 3 performs the process using once the hash function on $K_{n-2}$ received from the server 4, thereby obtaining $K_{n-1}'$, compares $K_{n-1}'$ with $K_{n-1}$, and performs authentication by determining whether $K_{n-1}'$ and $K_{n-1}$ match each other. When a server is proven to be the server 4 of the previous setting, the terminal 3 stores the transmitted set information as the terminal setting information 361 and the transmitted $K_{n-2}$ and n-2 as the cipher information 362 (step S23).

In such a manner, the terminal setting information 361 is safely updated. At the next authentication, when the next updating is performed, the process using the hash function is performed once on the transmitted $K_{n-3}$ by using $K_{n-2}$ and n-2 of the cipher information 362, and compares the result with $K_{n-2}$ to determine whether they match each other, thereby performing authentication.

When the server 4 transmits setting registration information, new keys $K_m$ and m are transmitted together with $K_{n-2}$. In this manner, even when the authentication using the new key $K_m$ is performed at the next authentication or the next updating, the foregoing exemplary embodiment can be similarly realized.

As described above, in the second exemplary embodiment, at the time of data transmission from the server 4 to the terminal 3 such as transmission of a change notification or setting registration information, the terminal 3 performs authentication using the one-time password previously obtained. Specifically, the terminal 3 performs the process using the hash function once on the one-time password currently transmitted, and performs authentication by determining whether the processed one-time password matches the one-time password obtained last time. A sound terminal determines whether the data transmission source is the same as the previous communication partner.

Consequently, while a sufficient security countermeasure against a hijack of communication by a false access point is taken, the setting of each terminal can be automatically updated.

Since authentication is performed by determining whether the one-time password coincides with that of the last time, transmission of a challenge code is unnecessary unlike a conventional challenge response method. The terminal 3 does not have to store the password. Only server 4 stores the password, and it can be confirmed that the communication is established with the same server as that of the previous communication with high reliability using the hash function.

Third Exemplary Embodiment

A third exemplary embodiment will now be described.

The third exemplary embodiment relates to a process performed when transmission of the setting registration information from the setting management server 4 to the information communication terminal 3 in the second embodiment cannot be performed due to disconnection of the power source of the terminal 3 or other causes.

Figure 10:
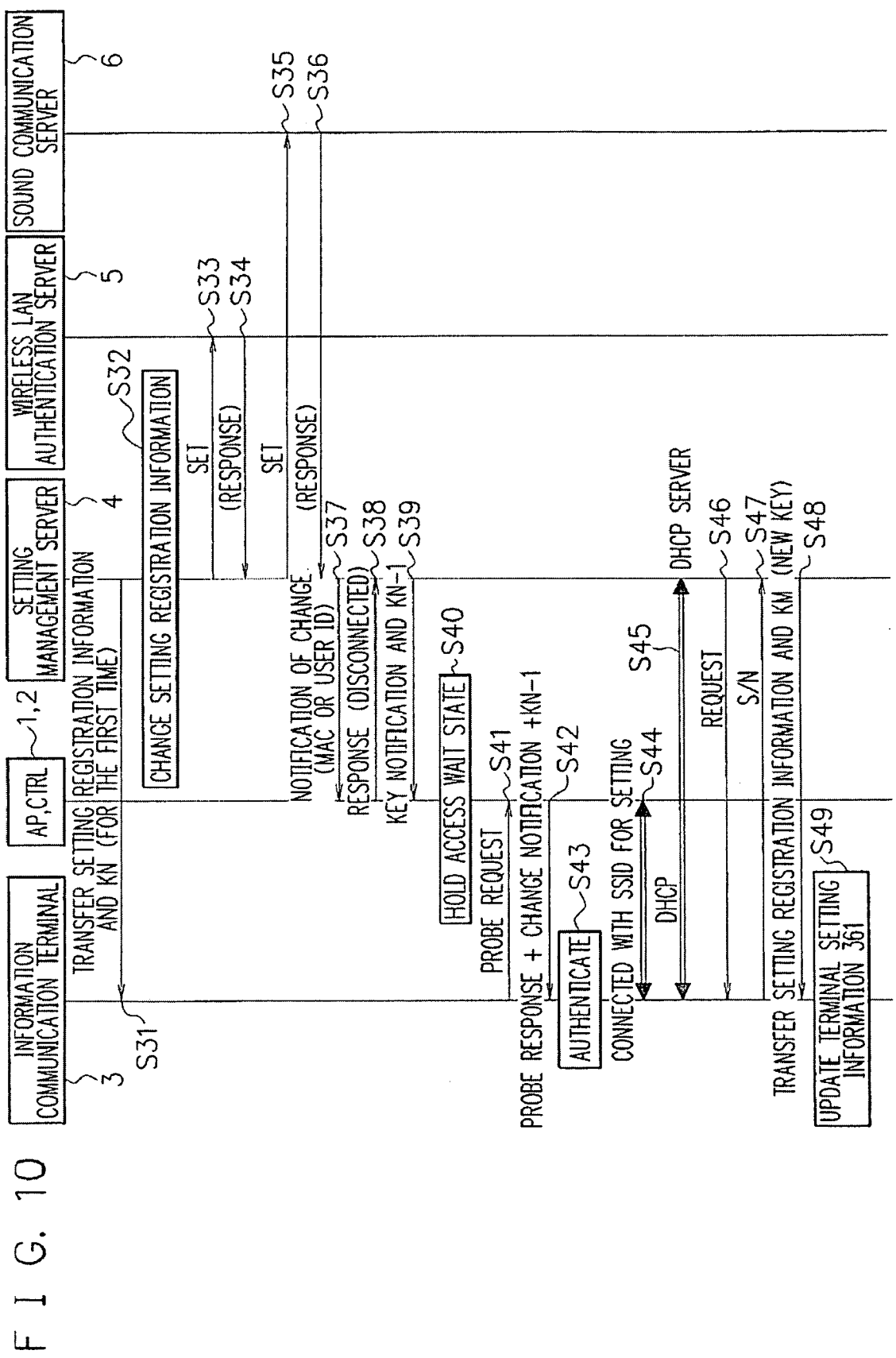
FIG. 10 is a sequence diagram showing an operation example of a radio communication system as a third embodiment.

The operation of a radio communication system will be described with reference to FIG. 10.

First, in a manner similar to the second exemplary embodiment, the terminal 3 obtains setting registration information from the server 4 and, simultaneously, receives key information $K_n$ and "n" when the connection to the server 4 is established for the first time, for example when the initial setting is performed (step S31).

When the setting of a terminal is changed by the administrator of the system or the like (step S32), the setting information in the wireless LAN authentication server 5 and the sound communication server 6 is changed, in a manner similar to the second exemplary embodiment (steps S33 to S36).

By the terminal information communication function of the server 4, unique information (MAC address or user ID) specifying a terminal is transmitted so as to be associated with the change notification to the system controller 1 that manages the radio base station 2 (step S37).

The system controller 1 refers to the connection state management table 131. When connection cannot be made to the terminal 3 specified by the unique information, the system controller 1 transmits a response that the terminal 3 is in a disconnection state to the server 4 (step S38).

Upon receipt of the response that the terminal 3 is in the disconnection state, the server 4 transmits the change notification together with $K_{n-1}$ to the terminal 3 (step S39).

The system controller 1 stores the MAC address of the terminal 3 in the connection state management table 131 so as to be associated with the transmitted one-time password $K_{n-1}$, and waits for a connection request (an access) from the terminal 3 (step S40).

When a probe request is transmitted from the terminal 3 waiting for a connection request to the radio base station 2 in the radio communication system (step S41), the system controller 1 sends back a probe response and, in addition, the change notification and the one-time password $K_{n-1}$ transmitted from the server 4 (step S42).

The terminal 3 performs the process using once the hash function on $K_{n-1}$ received from the system controller 1, thereby obtaining $K_n'$ from the equation $K_n'$=hash $(K_{n-1},1)$. The terminal 3 compares $K_n'$ with $K_n$ obtained at the previous setting and performs authentication by determining whether $K_n'$ and $K_n$ match each other (step S43).

When the one-time password is proven to be issued from the same server 4 as that of the previous change of the setting information, the terminal 3 transmits an attribution request to the wireless base station 2 by an SSID for setting change (step S44).

When the attribution request is transmitted by the SSID for setting change, a connection request by the SSID for setting change is transmitted to the server 4. The server 4 assigns an IP address to the terminal 3 by the terminal information communication function and establishes connection so as to be able to function as a DHC server (step S45).

After the connection by the SSID for setting change is established, the server 4 transmits a request for a serial number to the terminal 3 (step S46). When the terminal 3 sends back a serial number (step S47), the server 4 retrieves the setting information management table 441 on the basis of the serial number, and transmits setting registration information and new key information $K_m$ and m (step S48).

The terminal 3 stores the transmitted setting information as the terminal setting information 361 and the transmitted $K_m$ and m as the cipher information 362 (step S49).

In such a manner, the terminal setting information 361 is safely updated. At the next authentication, the process using the hash function is performed once on the transmitted $K_{m-1}$ by using $K_m$ and m of the cipher information 362, and compares the result with $K_m$ to determine whether they match each other, thereby performing authentication.

Also in the case of performing the next authentication using $K_{n-2}$ by transmitting $K_{n-2}$ and n−2 when the server 4 transmits setting registration information, the exemplary embodiment can be similarly realized.

As described above, in the third exemplary embodiment, at the time of data transmission from the server 4 to the terminal 3 such as transmission of a change notification or the like, the terminal 3 performs authentication using the one-time password previously obtained. Specifically, the terminal 3 performs the process using the hash function once on the one-time password currently transmitted, and performs authentication by determining whether the processed one-time password matches the one-time password previously obtained. A sound terminal determines whether the data transmission source is the same as the previous communication partner.

After the authentication, a connection is established with the SSID for setting change, communication is performed, and setting registration information and the like are transmitted/received.

Consequently, while a sufficient security countermeasure against a hijack of communication by a false access point is taken, the setting of a terminal can be automatically updated.

Since authentication is performed by determining whether the one-time password coincides with the previously obtained password, transmission of a challenge code is unnecessary unlike a conventional challenge response method. The terminal 3 does not have to store the password. Only server 4 stores the password, and it can be authenticated that the communication is established with the same server 4 with high reliability using the hash function.

Fourth Exemplary Embodiment

A fourth exemplary embodiment of the invention will now be described.

The fourth embodiment relates to a process performed when transmission of the setting registration information from the server 4 to the terminal 3 in the third exemplary embodiment cannot be performed due to disconnection of the power source of the terminal 3 or similar causes, and an access of the terminal 3 to the radio base station 2 for setting change is waited for.

Figure 11:
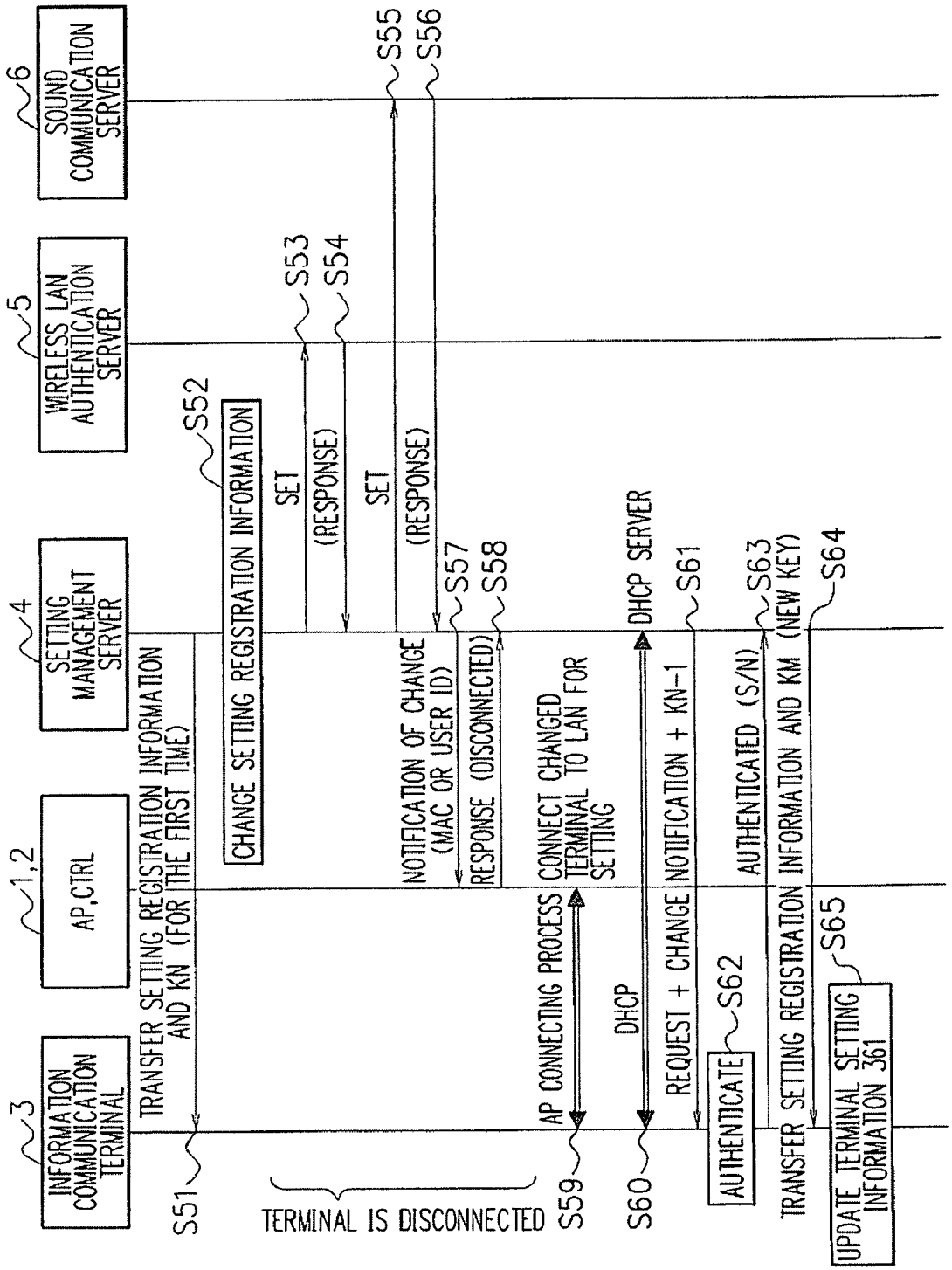
FIG. 11 is a sequence diagram showing an operation example of a radio communication system as a fourth embodiment.

The operation of a radio communication system will be described with reference to FIG. 11.

Operations from step S51, in which the information communication terminal 3 receives setting registration information and key at the time of connection to the setting management server 4 for the first time such as the initial setting, to step S58, in which the server 4 receives a response indicating that the connection is interrupted, are similar to those of steps S31 to S38 in the third exemplary embodiment, and their description will not be repeated.

When the response that the terminal 3 is in the disconnection state is received, the server 4 waits for an access of the terminal 3 to the radio base station 2 for setting change, and stops attempting transmission of a change notification.

The terminal 3 accesses the radio base station 2 for setting change, and transmits an attribution request to the radio base station 2 with the SSID for setting change (step S59).

When the attribution request is transmitted with the SSID for setting change, a connection request with the SSID for setting change is transmitted to the server 4. The server 4 assigns an IP address to the terminal 3 by the terminal information communication function and establishes a connection so as to be able to function as a DHCP server (step S60).

After the connection using the SSID for setting change is established, the server 4 transmits a request for a serial number, a change notification, and $K_{n-1}$ to the terminal 3 (step S61).

The terminal 3 performs the process using the hash function on $K_{n-1}$ received from the system controller 1 once, thereby obtaining $K_n'$: namely $K_n'$=hash $(K_{n-1},1)$. The terminal 3 compares $K_n'$ with $K_n$ obtained at the previous setting and performs authentication by determining whether $K_n'$ and $K_n$ match each other (step S62).

When it is confirmed that the one-time password was sent from the same server 4, the terminal 3 transmits a serial number as a notification of successful authentication (step S63).

The server 4 searches the setting information management table 441 on the basis of the serial number and transmits the setting registration information and new key information $K_m$ and m (step S64).

The terminal 3 stores the transmitted setting information as the terminal setting information 361, and the transmitted $K_m$ and m as the cipher information 362 (step S65).

In such a manner, the information 361 is safely updated. At the next authentication, the process using the hash function is performed once on the transmitted $K_{m-1}$ by using $K_m$ and m of the cipher information 362, and compares the result with $K_m$ to determine whether they match each other, thereby performing authentication.

Also in the case of performing the next authentication using $K_{n-2}$ at the time of the next updating or the like by transmitting $K_{n-2}$ and n−2 when the server 4 transmits setting registration information, the exemplary embodiment can be similarly realized.

As described above, in the fourth exemplary embodiment, at the data transmission from the server 4 to the terminal 3 such as transmission of a change notification or the like, the terminal 3 performs authentication using the one-time password previously obtained. Specifically, the terminal 3 performs the process using the hash function once on the one-time password transmitted this time and performs authentication by determining whether the processed one-time password matches the one-time password previously obtained. A sound terminal determines whether the data transmission source is the same as the previous communication partner.

Consequently, while a sufficient security countermeasure against a hijack of communication by a false access point is taken, the setting of a terminal can be automatically updated.

Since authentication is performed by determining whether the one-time password coincides with the previous password, transmission of a challenge code is unnecessary unlike a conventional challenge response method. The terminal 3 does not have to store the password. Only the server 4 stores the password in the server 4, it can be confirmed that the communication is established with the same server 4 with high reliability using the hash function.

Fifth Exemplary Embodiment

A fifth exemplary embodiment of the invention will now be described.

The terminal setting information 361 in the first to fourth exemplary embodiments is now provided with expiration date.

Figure 12:
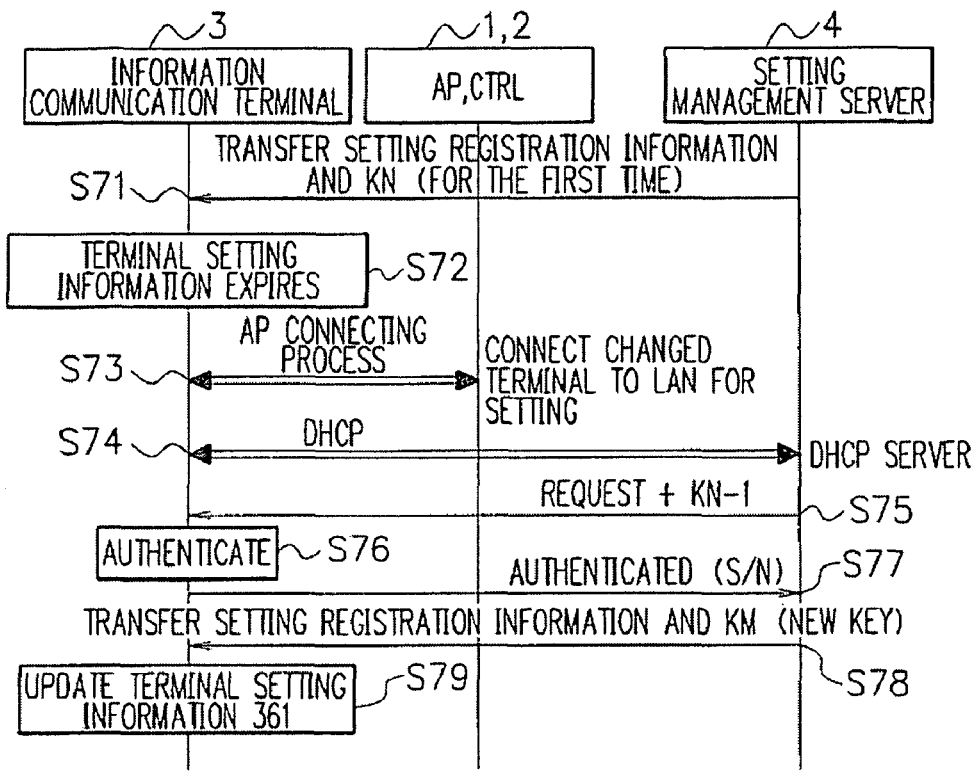
FIG. 12 is a sequence diagram showing an operation example of a radio communication system as a fifth embodiment.
Figure 13:
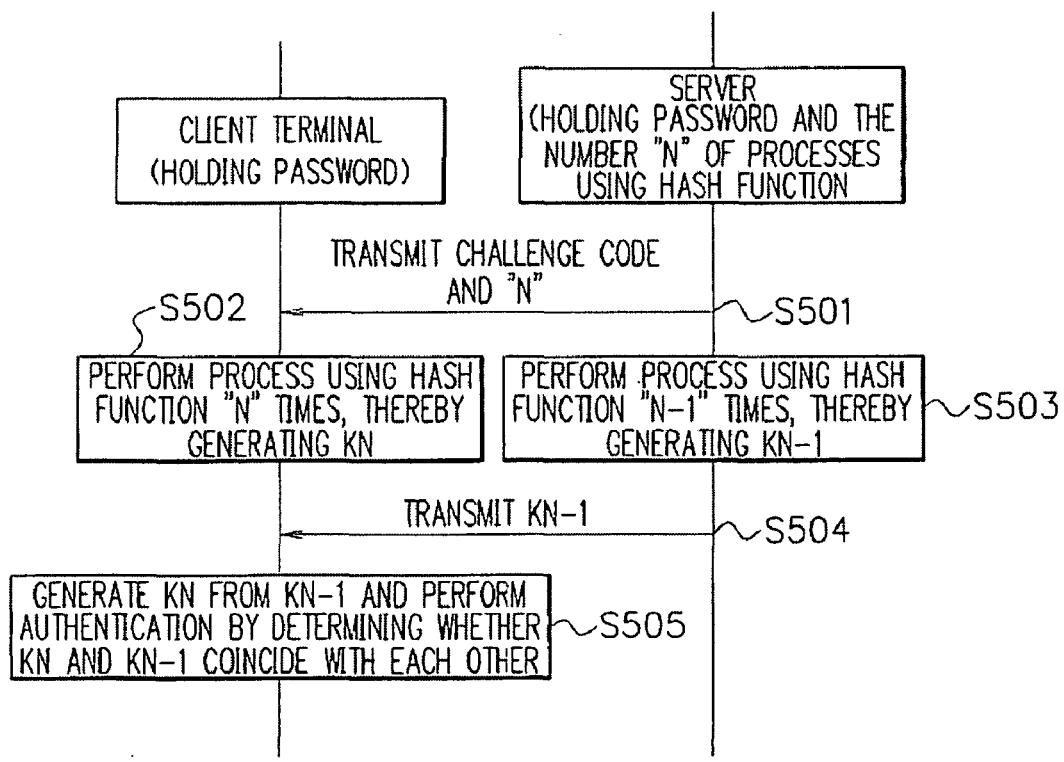
FIG. 13 is a sequence diagram showing an example of authentication by a conventional challenge-response method.

The operation of a radio communication system will be described with reference to FIG. 12.

First, in a manner similar to the fourth exemplary embodiment, the terminal 3 receives setting registration information and simultaneously key information $K_n$ and "n" from the server 4 at the time of connection to the server 4 for the first time such as the initial setting (step S71).

Thereafter, when the terminal setting information 361 becomes no longer valid without the automatic updating from the server 4 as shown in the first to fourth exemplary embodiments (step S72), the terminal 3 accesses the radio base station 2 for setting change and transmits an attribution request to the radio base station 2 with the SSID for setting change (step S73).

When the attribution request is transmitted with the SSID for setting change, a connection request with the SSID for setting change is transmitted to the server 4. The server 4 assigns an IP address to the terminal 3 by the terminal information communication function and establishes a connection so as to be able to function as a DHCP server (step S74).

After the connection using the SSID is established, the server 4 transmits a request for a serial number, a change notification, and $K_{n-1}$ to the terminal 3 (step S75).

The terminal 3 performs the process using once the hash function on $K_{n-1}$ received from the system controller 1, thereby obtaining $K_n'$: namely $K_n'$=hash ($K_{n-1}$,1). The terminal 3 compares $K_n'$ with $K_n$ obtained at the previous setting and performs authentication by determining whether $K_n'$ and $K_n$ match each other (step S76).

When it is confirmed that the one-time password was sent from the same server 4 as the server of the previous changing operation of setting information, the terminal 3 transmits a serial number as a notification of successful authentication (step S77).

The server 4 searches the setting information management table 441 on the basis of the serial number and transmits the setting registration information with the expiry date and new key information $K_m$ and m (step S78).

The terminal 3 stores the transmitted setting information with the expiry date as the terminal setting information 361 and the transmitted $K_m$ and m as the cipher information 362 (step S79).

In such a manner, the terminal setting information 361 is safely updated. At the next authentication such as the next updating operation, the process using the hash function is performed once on the transmitted $K_{m-1}$ by using $K_m$ and m of the cipher information 362, and compares the result with $K_m$ to determine whether they match each other, thereby performing authentication.

The server 4 may transmit setting registration information with $K_{n-2}$ and n−2. In this way, when the authentication is performed next time, using $K_{n-2}$, the embodiment can be similarly realized.

As described above, in the fifth exemplary embodiment, by providing the terminal setting information with expiry date, the setting information can be prevented from becoming too old, and the latest terminal setting information can be always shared between the server 4 and the terminal 3.

Even after the expiry date of the information, a connection is established based on the SSID that is for use in setting change, and a communication is performed. At the time of initial data transmission from the server 4 to the terminal 3, the terminal 3 performs authentication using the one-time password previously obtained. Specifically, the terminal 3 performs the process using the hash function once on the one-time password transmitted this time, and performs authentication by determining whether the processed one-time password matches the one-time password previously obtained. A sound terminal determines whether the data transmission source is the same as the previous communication partner.

Consequently, while a sufficient security countermeasure is taken for a spurious access point not to hijack communication, the setting of a terminal can be automatically updated.

Since authentication is performed by determining whether the one-time password coincides with the previous password, transmission of a challenge code is unnecessary unlike a conventional challenge response method. The terminal 3 does not have to store the password. Only the server 4 stores the password, and it can be confirmed that the communication is established with the same server 4 with high reliability using the hash function.

Sixth Exemplary Embodiment

The authentication apparatus may include a receiving unit that receives information from the apparatus to be authenticated, an encrypting unit that processes an encrypted password, which is obtained by being processed for a subtracted number of times with the one-way function, the subtraction number derived by subtracting the subtracted number of times from the number of times of processing, and an authenticating unit that performs authentication by determining whether the password calculated by the encrypting unit coincides with the encrypted password received by the receiving unit.

Seventh Exemplary Embodiment

The authentication apparatus may perform authentication on the basis of the encrypted password obtained by being processed for the predetermined number of times and the encrypted password obtained by being processed for the subtracted number of times, the passwords being received from the apparatus to be authenticated.

Eighth Exemplary Embodiment

The authentication apparatus may have: a receiving unit that receives information from the apparatus to be authenticated; an encrypting unit that processes once the encrypted password with the one-way function, the encrypted password being obtained by being processed for the subtracted number of times, transmitted from the apparatus to be authenticated; and an authenticating unit that performs authentication by determining whether the password calculated by the encrypting unit coincides with the encrypted password obtained by being processed for the predetermined number of times.

Ninth Exemplary Embodiment

The apparatus to be authenticated may be a setting management apparatus for managing setting information of the authentication apparatus, and has setting information transmitting unit that, when the apparatus to be authenticated is authenticated by the authentication apparatus, transmits the setting information of the authentication apparatus to the authentication apparatus.

Tenth Exemplary Embodiment

The apparatus to be authenticated may include a change notifying unit that, when setting information is changed, issue the change, and the setting information transmitting unit transmits the setting information after notification of the change notifying unit.

Eleventh Exemplary Embodiment

The authentication system may further include a connection control unit that performs connection control between the authentication apparatus and the apparatus to be authenticated. The connection control unit has a holding and waiting unit for, when the authentication apparatus is not connected at the time point the apparatus to be authenticated attempts an access to the authentication apparatus via the connection control unit, holding the change notification transmitted from the change notifying unit of the apparatus to be authenticated and the encrypted password obtained by being processed for the subtracted number of times and transmitted from the second transmitting unit, and waiting for becoming accessible to the authentication apparatus.

Twelfth Exemplary Embodiment

The authentication system may further include a connecting unit that connects the authentication apparatus as a network for setting when the authentication apparatus is not connected at the time the apparatus to be authenticated attempts an access to the authentication apparatus, and thereafter, the apparatus to be authenticated becomes accessible to the authentication apparatus. The setting information transmitting unit transmits the setting information to the authentication apparatus connected as a network for setting by the setting connecting unit.

Thirteenth Exemplary Embodiment

The setting information may be provided with a period of validity, and the authentication apparatus may have a setting connecting unit to be connected as a network for setting to the apparatus to be authenticated when the period of validity expires.

Fourteenth Exemplary Embodiment

The authentication apparatus may be an information communication terminal connected to a network, and the apparatus to be authenticated manages setting information of the information communication terminal as the setting management apparatus.

Fifteenth Exemplary Embodiment

The apparatus to be authenticated may be a setting managing apparatus for managing setting information of the authentication apparatus, and include a setting information transmitting unit that, when the apparatus to be authenticated is authenticated by the authentication apparatus, transmits setting information of the authentication apparatus to the authentication apparatus.

Sixteenth Exemplary Embodiment

The apparatus to be authenticated may further include a change notifying unit that, when setting information is changed, issues the change, and the setting information transmitting unit transmits the setting information after notification of the change notifying unit.

Seventeenth Exemplary Embodiment

The apparatus to be authenticated may further include a connecting unit that connects the authentication apparatus as a network for setting when the authentication apparatus is not connected at the time the apparatus to be authenticated attempts an access to the authentication apparatus, and thereafter the apparatus to be authenticated becomes accessible to the authentication apparatus. The setting information transmitting unit transmits the setting information to the authentication apparatus connected as a network for setting by the connecting unit for setting.

Eighteenth Exemplary Embodiment

The authentication apparatus may be an information communication terminal connected to a network. The apparatus to be authenticated is a setting management apparatus for managing setting information of the information communication terminal. The setting information is provided with a period of validity, and the authentication apparatus has setting connecting unit to be connected as a network for setting to the apparatus to be authenticated when the period of validity expires.

Nineteenth Exemplary Embodiment

The authentication apparatus may perform authentication on the basis of an encrypted password obtained by being processed for the number of times of processing, the information indicative of the number of times of processing, the encrypted password obtained by being processed for the subtracted number of times, and the information indicative of the subtracted number of times, the passwords and information being received from the apparatus to be authenticated.

Twentieth Exemplary Embodiment

The authentication apparatus may include: an encrypting step of processing an encrypted password, which is obtained by being processed for the subtracted number of times and transmitted in the second transmitting step, with the one-way function for the subtraction number derived by subtracting the subtracted number of times from the number of times of processing; and an authenticating step of performing authentication of the authentication apparatus by determining whether the password calculated in the encrypting step coincides with the encrypted password transmitted in the first transmitting step.

Twenty-first Exemplary Embodiment

The authentication apparatus performs authentication on the basis of an encrypted password obtained by being processed for the predetermined number of times and the encrypted password obtained by being processed for the subtracted number of times, the passwords being received from the apparatus to be authenticated.

Twenty-second Exemplary Embodiment

The authentication apparatus may include: an encrypting step of processing once the encrypted password transmitted in the second transmitting step with the one-way function; and an authenticating step of authenticating the apparatus to be authenticated by the authentication apparatus by determining whether the password calculated in the encrypting step coincides with the encrypted password transmitted in the first transmitting step.

Twenty-third Exemplary Embodiment

The apparatus to be authenticated may be a setting management apparatus for managing setting information of the authentication apparatus, and include a setting information transmitting step of, when the apparatus to be authenticated is authenticated by the authentication apparatus, transmitting the setting information of the authentication apparatus to the authentication apparatus.

Twenty-fourth Exemplary Embodiment

The authenticating method may further include a change notifying step of, when setting information is changed, sending a notification of the change from the apparatus to be authenticated to the authentication apparatus. In the setting information transmitting step, the setting information is transmitted after notification in the change notifying step.

Twenty-fifth Exemplary Embodiment

The authenticating method may further include a holding and waiting step of, when the authentication apparatus is not connected at the time the apparatus to be authenticated attempts an access to the authentication apparatus, holding the change notification transmitted from the apparatus to be authenticated and the encrypted password calculated in the second transmitting step in connection control unit that performs connection control between the authentication apparatus and the apparatus to be authenticated, and waiting for the time when the apparatus to be authenticated becomes accessible to the authentication apparatus.

Twenty-sixth Exemplary Embodiment

The apparatus to be authenticated may include a setting connecting step of connecting the authentication apparatus as a network for setting when the authentication apparatus is not connected at the time point the apparatus to be authenticated attempts an access to the authentication apparatus, and thereafter the apparatus to be authenticated becomes accessible to the authentication apparatus. In the setting information transmitting step, the setting information is transmitted to the authentication apparatus connected as the network for setting in the setting connecting step.

Twenty-seventh Exemplary Embodiment

The setting information may be provided with a period of validity, and the method further includes a setting connecting step of connecting the authentication apparatus as a network for setting to the apparatus to be authenticated when the period of validity expires.

Twenty-eighth Exemplary Embodiment

The apparatus to be authenticated may be a setting managing apparatus for managing setting information of the authentication apparatus. When the apparatus to be authenticated is authenticated by the authentication apparatus in the authenticating process, the program causes the apparatus to be authenticated to execute a setting information transmitting process for transmitting setting information of the authentication apparatus to the authentication apparatus.

Twenty-ninth Exemplary Embodiment

When setting information is changed, the apparatus to be authenticated may be made to execute a change notifying process of notifying the authentication apparatus of the change. In the setting information transmitting process, the setting information is transmitted after notification of the change notifying process.

Thirtieth Exemplary Embodiments

The computer-readable medium having a program may cause the authentication apparatus to perform an authenticating process for authenticating the apparatus to be authenticated, by determining whether an encrypted password obtained by processing the password with the one-way function the number of processing times and received in the receiving process coincides with a password calculated by the encrypting process.

Thirty-first Exemplary Embodiment

The computer-readable medium having a program may cause the authentication apparatus to perform an authenticating process for authenticating the apparatus to be authenticated, by determining whether an encrypted password obtained by processing the password with the one-way function for the number of times of processing coincides with a password calculated in the encrypting process.

Thirty-second Exemplary Embodiment

The setting information may be provided with a period of validity, and the program embedded in a computer-readable medium may cause the authentication apparatus to perform a setting connecting process for connecting the authentication apparatus as a network for setting to the apparatus to be authenticated when the period of validity expires.

Modifications

The foregoing embodiments are preferred embodiments of the present invention. The present invention is not limited to the foregoing embodiments but can be variously modified on the basis of the technical idea of the invention.

For example, though the radio communication systems have the configurations as an example shown in FIGS. 1 to 7, the system configuration is not limited to the above configurations but may include various devices as long as the system includes an information communication terminal performing radio communication, and a setting management apparatus that manages the setting information of the information communication terminal.

Although it has been described in the exemplary embodiments that the terminal 3 has the function of performing sound communication with another terminal 3 and the like, the invention is not limited to the terminal 3. As long as a radio communication terminal performs radio communication, various terminals such as a radio communication terminal for data communication may be used.

It has been described that, as shown in FIG. 7, the setting information management table 441 stores the MAC address of the terminal 3 in association with the serial number of the terminal, setting registration information, and cipher information. However, either one of the MAC address or the serial number may be used instead of both the MAC address and the serial number. Further, other kinds of information may be used as long as those kinds of information can specify one terminal.

When authentication is conducted, the server 4, an authenticated apparatus, generates and transmits a one-time password to which the hash function is applied one time fewer than the previous one-time password. The terminal 3 as the authentication apparatus performs the process using the hash function on the one-time password last obtained, and performs authentication by determining whether the one-time password coincides with the one-time password last obtained. The degree of decreasing the number of processes using the hash function is not limited to one but may be arbitrary number of times.

In this case, the terminal 3 as the authentication apparatus detects the difference between the number of times of hash function processing and the previously transmitted number, and performs hash function processes, according to the difference, on a one-time password transmitted this time, thereby performing authentication of determining whether the one-time password coincides with the one-time password last obtained.

The ciphering process has been described as a process using the hash function. Various hash functions may be used such as SHA-1 (Secure Hash Algorithm 1) and MD5 (Message Digest 5).

As long as the function is a one-way function, the function is not limited to the hash function but various functions may be used.

When a function y=f(x) is a one-way function, it is easy to calculate y=f(x) from x but it is extremely difficult to obtain x from y.

By recording the procedure for realizing the radio communication systems as a program in a recording medium, the functions in the embodiments can be realized by causing the CPU of a computer to perform the processes by the program supplied from the recording medium.

The present invention can be also applied to the case where pieces of information including the program are supplied to an output unit from the recording medium or an external recording medium via a network.

That is, a program code itself read from a recording medium realizes a novel function of the present invention, and a recording medium storing the program code and a signal read from the recording medium are components of the present invention.

Examples of the recording medium include a floppy (registered trademark) disk, a hard disk, an optical disk, a magneto-optical disk, a CD-ROM, a CD-R, a magnetic tape, a nonvolatile memory card, a ROM, and an EEPROM.

With the program according to the present invention, the above-described functions can be realized in a radio communication system and devices constituting the system controlled by the program.

An exemplary advantage according to the invention is that a communication can be authenticated as a communication that was performed with the same apparatus to be authenticated by high-reliable authentication using a one-way function, without necessity of transmission of a challenge code, only by storing a password only in the apparatus to be authenticated (it is unnecessary to store a password in both of the authentication apparatus and the apparatus to be authenticated).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2006-188540, filed on Jul. 7, 2006, the disclosure of which is incorporated herein in its entirety by reference.

The invention claimed is:

1. An authentication system comprising an authentication apparatus and an apparatus to be authenticated, wherein the apparatus to be authenticated is a setting management apparatus for managing setting information of the authentication apparatus, and comprises:
a storing unit which stores a password and information indicative of a number of times of processing, for which the password is processed repeatedly with a predetermined one-way function;
a first transmitting unit which transmits an encrypted password obtained by processing the password with the predetermined one-way function for the number of times of processing, and the information indicative of the number of times of processing to the authentication apparatus; and
a second transmitting unit which transmits an encrypted password obtained by processing the password with the predetermined one-way function for a subtracted number of times derived by subtracting a predetermined subtraction number from the number of times of processing, and the subtracted number of times to the authentication apparatus,
wherein the authentication apparatus performs authentication on the basis of the encrypted password that was processed for the number of times of processing, the information indicative of the number of times of processing, the encrypted password that was processed for the subtracted number of times, and the information indicative of the subtracted number of times,
wherein the apparatus to be authenticated comprises a setting information transmitting unit which, when the apparatus to be authenticated is authenticated by the authentication apparatus, transmits a set of updated setting information with a period of validity to the authentication apparatus to enable the authentication apparatus to connect to a wireless network and to access the apparatus to be authenticated.

2. The authentication system according to claim 1, wherein the authentication apparatus comprises:
a receiving unit which receives information from the apparatus to be authenticated;
an encrypting unit which processes the encrypted password, which is obtained by being processed for the subtracted number of times, with the predetermined one-way function for the predetermined subtraction number derived by subtracting the subtracted number of times from the number of times of processing; and
an authenticating unit which performs authentication by determining whether the password calculated by the encrypting unit coincides with the encrypted password received by the receiving unit from the first transmitting unit of the apparatus to be authenticated.

3. The authentication system according to claim 1, wherein the authentication apparatus is an information communication terminal connected to a network and performing communication, and
the apparatus to be authenticated manages setting information of the information communication terminal as the setting management apparatus.

4. An authentication system comprising an authentication apparatus and an apparatus to be authenticated,
wherein the apparatus to be authenticated is a setting management apparatus for managing setting information of the authentication apparatus, and comprises:
a storing unit which stores a password and information indicative of a number of times of processing for which the password is processed with a predetermined one-way function;

a first transmitting unit which transmits an encrypted password obtained by processing the password with the one-way function for the number of times of processing, and the information indicative of the number of times of processing to the authentication apparatus; and
a second transmitting unit which transmits an encrypted password obtained by processing the password with the predetermined one-way function for a subtracted number of times derived by subtracting one from the number of times of processing, and the subtracted number of times to the authentication apparatus,
wherein the authentication apparatus performs authentication on the basis of the encrypted password that was processed for the number of times of processing, the information indicative of the number of times of processing, the information indicative of the subtracted number of times and the encrypted password that was processed for the subtracted number of times,
wherein the apparatus to be authenticated comprises a setting information transmitting unit which, when the apparatus to be authenticated is authenticated by the authentication apparatus, transmits a set of updated setting information with a period of validity to the authentication apparatus to enable the authentication apparatus to connect to a wireless network and to access the apparatus to be authenticated.

5. The authentication system according to claim 4, wherein the authentication apparatus comprises:
a receiving unit which receives the set of updated setting information from the apparatus to be authenticated;
an encrypting unit which processes only once the encrypted password with the predetermined one-way function, the encrypted password being obtained by being processed for the subtracted number of times; and
an authenticating unit which performs authentication by determining whether the password calculated by the encrypting unit coincides with the encrypted password obtained by being processed for the number of times of processing.

6. The authentication system according to claim 4, wherein the authentication apparatus is an information communication terminal connected to a network and performing communication, and
the apparatus to be authenticated manages setting information of the information communication terminal as the setting management apparatus.

7. An apparatus to be authenticated for sending an authentication request to an authentication apparatus, the apparatus to be authenticated being a setting management apparatus for managing setting information of the authentication apparatus, comprising:
a storing unit which stores a password and information indicative of a number of times of processing of the password with a predetermined one-way function;
a first transmitting unit which transmits an encrypted password obtained by processing the password with the predetermined one-way function for the number of times of processing, and the information indicative of the number of times of processing to the authentication apparatus;
a second transmitting unit which transmits an encrypted password obtained by processing the password with the predetermined one-way function for a number of times derived by subtracting a predetermined subtraction number from the number of times of processing, and the subtracted number of times to the authentication apparatus, wherein the authentication apparatus performs authentication on the basis of the encrypted password that was processed for the number of times of processing, the information indicative of the number of times of processing, the encrypted password that was processed for the subtracted number of times, and the information indicative of the subtracted number of times; and
a setting information transmitting unit which, when the apparatus to be authenticated is authenticated by the authentication apparatus, transmits a set of updated setting information with a period of validity to the authentication apparatus to enable the authentication apparatus to connect to a wireless network and to access the apparatus to be authenticated.

8. An apparatus to be authenticated for sending an authentication request to an authentication apparatus, the apparatus to be authenticated being a setting management apparatus for managing setting information of the authentication apparatus, comprising:
a storing unit which stores a password and information indicative of a number of times of processing of the password with a predetermined one-way function;
a first transmitting unit which transmits an encrypted password obtained by processing the password with the predetermined one-way function for the number of times of processing to the authentication apparatus;
a second transmitting unit which transmits an encrypted password obtained by processing the password with the predetermined one-way function for a subtracted number of times one smaller than the number of times of processing to the authentication apparatus, wherein the authentication apparatus performs authentication on the basis of the encrypted password that was processed for the number of times of processing, the information indicative of the number of times of processing, the encrypted password that was processed for the subtracted number of times, and the information indicative of the subtracted number of times; and
a setting information transmitting unit which, when the apparatus to be authenticated is authenticated by the authentication apparatus, transmits a set of updated setting information with a period of validity to the authentication apparatus to enable the authentication apparatus to connect to a wireless network and to access the apparatus to be authenticated.

9. An authentication apparatus for performing authentication in response to an authentication request from an apparatus to be authenticated, comprising:
a receiving unit which receives an encrypted password obtained by processing a password with a one-way function for a predetermined number of times of processing from the apparatus to be authenticated;
an encrypting unit which, when an encrypted password obtained by processing the password with the one-way function for a subtracted number of times derived by subtracting a predetermined subtraction number from the predetermined number of times of processing received by the receiving unit from the apparatus to be authenticated, processes the encrypted password with the one-way function for a subtraction number calculated by subtracting the subtracted number of times from the predetermined number of times of processing; and
an authenticating unit which authenticates the apparatus to be authenticated, by determining whether the encrypted password obtained by processing the password with the one-way function for the predetermined number of times of processing coincides with the encrypted password calculated by the encrypting unit, wherein the apparatus to be authenticated comprises a setting information transmitting unit which, when the apparatus to be authenticated is authenticated by the authentication apparatus, transmits a set of updated setting information with a period of validity to the authentication apparatus to enable the authentication apparatus to connect to a wireless network and to access the apparatus to be authenticated.

10. An authentication apparatus for authenticating an apparatus to be authenticated in response to an authentication request from the apparatus to be authenticated, comprising:
   a receiving unit which receives an encrypted password obtained by processing a password with a one-way function for a predetermined number of times of processing from the apparatus to be authenticated;
   an encrypting unit which processes once the encrypted password with the one-way function when an encrypted password obtained by processing the password with the one-way function for a subtracted number of times one smaller than the predetermined number of times of processing received by the receiving unit from the apparatus to be authenticated; and
   an authenticating unit which authenticates the apparatus to be authenticated, by determining whether the encrypted password obtained by processing the password with the one-way function for the predetermined number of times of processing of coincides with the encrypted password calculated by the encrypting unit,
   wherein the apparatus to be authenticated comprises a setting information transmitting unit which, when the apparatus to be authenticated is authenticated by the authentication apparatus, transmits a set of updated setting information with a period of validity to the authentication apparatus to enable the authentication apparatus to enable the authentication apparatus to connect to a wireless network and to access the apparatus to be authenticated.

11. An authenticating method in an authentication system comprising an authentication apparatus and an apparatus to be authenticated, the apparatus to be authenticated being a setting management apparatus for managing setting information of the authentication apparatus, comprising:
   a first transmitting step of transmitting from the apparatus to be authenticated an encrypted password obtained by processing a password with a predetermined one-way function for a predetermined number of times of processing, and information indicative of the predetermined number of times of processing to the authentication apparatus;
   a second transmitting step of transmitting an encrypted password obtained by processing the password with the predetermined one-way function for a subtracted number of times derived by subtracting a predetermined subtraction number from the predetermined number of times of processing, and the subtracted number of times from the apparatus to be authenticated to the authentication apparatus; and
   a setting information transmitting step of, when the apparatus to be authenticated is authenticated by the authentication apparatus, transmitting a set of updated setting information with a period of validity from the apparatus to be authenticated to the authentication apparatus to enable the authentication apparatus to connect to a wireless network and to access the apparatus to be authenticated,
   wherein the authentication apparatus performs authentication on the basis of the encrypted password that was processed for the predetermined number of times of processing, the information indicative of the predetermined number of times of processing, the encrypted password obtained by being processed the subtracted number of times, and the information indicative of the subtracted number of times.

12. The authenticating method according to claim 11, wherein the authentication apparatus further performs:
   an encrypting step of processing the encrypted password, which is obtained by being processed for the subtracted number of times with the predetermined one-way function for the predetermined subtraction number derived by subtracting the subtracted number of times from the predetermined number of times of processing; and
   an authenticating step of authenticating the apparatus to be authenticated by the authentication apparatus by determining whether the encrypted password calculated in the encrypting step coincides with the encrypted password transmitted in the first transmitting step.

13. An authenticating method in an authentication system comprising an authentication apparatus and an apparatus to be authenticated, the apparatus to be authenticated being a setting management apparatus for managing setting information of the authentication apparatus, comprising:
   a first transmitting step of transmitting from the apparatus to be authenticated an encrypted password obtained by processing a password with a predetermined one-way function for a predetermined number of times of processing, and the information indicative of the predetermined number of times of processing to the authentication apparatus;
   a second transmitting step of transmitting from the apparatus to be authenticated an encrypted password obtained by processing the password with the predetermined one-way function for a subtracted number of times derived by subtracting one from the predetermined number of times of processing, and the subtracted number of times to the authentication apparatus; and
   a setting information transmitting step of, when the apparatus to be authenticated is authenticated by the authentication apparatus, transmitting a set of updated setting information with a period of validity from the apparatus to be authenticated to the authentication apparatus to enable the authentication apparatus to connect to a wireless network and to access the apparatus to be authenticated,
   wherein the authentication apparatus performs authentication on the basis of the encrypted password obtained by being processed for the predetermined number of times of processing, the information indicative of the predetermined number of times of processing, the information indicative of the subtracted number of times and the encrypted password obtained by being processed for the subtracted number of times.

14. The authenticating method according to claim 13, wherein the authentication apparatus further performs:
   an encrypting step of processing once the encrypted password transmitted in the second transmitting step with the predetermined one-way function; and
   an authenticating step of authenticating the apparatus to be authenticated by the authentication apparatus by determining whether the encrypted password calculated in the encrypting step coincides with the encrypted password transmitted in the first transmitting step.

15. A non-transitory computer-readable medium having computer-executable instructions for performing a method for an apparatus to be authenticated that sends an authentication request to an authentication apparatus, the apparatus to be authenticated being a setting management apparatus for managing setting information of the authentication apparatus, the method comprising:
- a first transmitting process for transmitting an encrypted password obtained by processing a password with a predetermined one-way function for a predetermined number of times of processing, and information indicative of the predetermined number of times of processing from the apparatus to be authenticated to the authentication apparatus;
- a second transmitting process for transmitting an encrypted password obtained by processing the password with the predetermined one-way function for a subtracted number of times derived by subtracting a predetermined subtraction number from the predetermined number of times of processing, and the subtracted number of times from the apparatus to be authenticated to the authentication apparatus; and
- a setting information transmitting process for, when the apparatus to be authenticated is authenticated by the authentication apparatus, transmitting a set of updated setting information with a period of validity from the apparatus to be authenticated to the authentication apparatus to enable the authentication apparatus to connect to a wireless network and to access the apparatus to be authenticated, wherein the authentication apparatus performs authentication on the basis of the encrypted password obtained by being processed for the predetermined number of times of processing, the information indicative of the predetermined number of times of processing, the information indicative of the subtracted number of times and the encrypted password obtained by being processed for the subtracted number of times.

16. A non-transitory computer-readable medium having computer-executable instructions for performing a method for an apparatus to be authenticated which sends an authentication request to an authentication apparatus, the apparatus to be authenticated being a setting management apparatus for managing setting information of the authentication apparatus, the method comprising:
- a first transmitting process for transmitting an encrypted password obtained by processing a password with a predetermined one-way function for a predetermined number of times of processing, and information indicative of the predetermined number of times of processing from the apparatus to be authenticated to the authentication apparatus;
- a second transmitting process for transmitting an encrypted password obtained by processing the password with the predetermined one-way function for a subtracted number of times one smaller than the predetermined number of times of processing, and the subtracted number of times from the apparatus to be authenticated to the authentication apparatus; and
- a setting information transmitting process for, when the apparatus to be authenticated is authenticated by the authentication apparatus, transmitting a set of updated setting information with a period of validity from the apparatus to be authenticated to the authentication apparatus to enable the authentication apparatus to connect to a wireless network and to access the apparatus to be authenticated, wherein the authentication apparatus performs authentication on the basis of the encrypted password obtained by being processed for the predetermined number of times of processing, the information indicative of the predetermined number of times of processing, the information indicative of the subtracted number of times and the encrypted password obtained by being processed for the subtracted number of times.

17. A non-transitory computer-readable medium having computer-executable instructions for performing a method for an authentication apparatus for authenticating an apparatus to be authenticated in response to an authentication request from the apparatus to be authenticated, the method comprising:
- a receiving process for receiving an encrypted password obtained by processing a password with a one-way function for a predetermined number of times of processing from the apparatus to be authenticated;
- an encrypting process for, when an encrypted password obtained by processing the password with the one-way function for a subtracted number of times derived by subtracting a predetermined subtraction number from the predetermined number of times of processing received in the receiving process from the apparatus to be authenticated, processing the encrypted password with the one-way function for a subtraction number calculated by subtracting the subtracted number of times from the predetermined number of times of processing;
- an authenticating process for authenticating the apparatus to be authenticated, by determining whether the encrypted password obtained by processing the password with the one-way function for the predetermined number of times of processing received in the receiving process coincides with the encrypted password calculated in the encrypting process; and
- a setting information transmitting process which, when the apparatus to be authenticated is authenticated by the authentication apparatus, transmits a set of updated setting information with a period of validity to the authentication apparatus to enable the authentication apparatus to connect to a wireless network and to access the apparatus to be authenticated.

18. A non-transitory computer-readable medium having computer-executable instructions for performing a method for an authentication apparatus for authenticating an apparatus to be authenticated in response to an authentication request from the apparatus to be authenticated, the method comprising:
- a receiving process for receiving an encrypted password obtained by processing a password with a one-way function for a predetermined number of times of processing from the apparatus to be authenticated;
- an encrypting process for, when an encrypted password obtained by processing the password with the one-way function for a subtracted number of times one smaller than the predetermined number of times of processing received from the apparatus to be authenticated in the receiving process, processing once the encrypted password with the one-way function;
- an authenticating process for authenticating the apparatus to be authenticated, by determining whether the encrypted password obtained by processing the password with the one-way function for the predetermined number of times of processing received in the receiving step coincides with the encrypted password calculated in the encrypting process; and
- a setting information transmitting process which, when the apparatus to be authenticated is authenticated by the authentication apparatus, transmits a set of updated setting information with a period of validity to the authentication apparatus to enable the authentication apparatus to connect to a wireless network and to access the apparatus to be authenticated.

* * * * *